(12) United States Patent (10) Patent No.: US 7,552,222 B2
Garimella et al. (45) Date of Patent: Jun. 23, 2009

(54) SINGLE SYSTEM USER IDENTITY

(75) Inventors: Sandilya Garimella, San Jose, CA (US); Sanjay Dalal, Sunnyvale, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 164 days.

(21) Appl. No.: 10/212,303

(22) Filed: Aug. 5, 2002

(65) Prior Publication Data

US 2003/0079029 A1 Apr. 24, 2003

Related U.S. Application Data

(60) Provisional application No. 60/392,144, filed on Jun. 27, 2002.

(51) Int. Cl.
*G06F 15/16* (2006.01)
*G06F 7/00* (2006.01)
(52) U.S. Cl. .......................... 709/229; 709/225; 707/9; 719/314; 717/120
(58) Field of Classification Search ................ 709/229, 709/219, 216, 225; 726/15, 26, 150; 707/8; 719/314; 717/120
See application file for complete search history.

(56) References Cited

U.S. PATENT DOCUMENTS

| | | | | |
|---|---|---|---|---|
| 4,794,521 A | * | 12/1988 | Ziegler et al. | 711/130 |
| 5,321,841 A | * | 6/1994 | East et al. | 718/107 |
| 5,404,395 A | * | 4/1995 | Bogart et al. | 379/201.03 |
| 5,469,562 A | | 11/1995 | Saether | |
| 5,604,860 A | | 2/1997 | McLaughlin et al. | |
| 5,630,131 A | | 5/1997 | Palevich et al. | |
| 5,748,975 A | | 5/1998 | Van De Vanter | 395/793 |
| 5,801,958 A | | 9/1998 | Dangelo et al. | |

(Continued)

FOREIGN PATENT DOCUMENTS

CA 2248634 3/2000

(Continued)

OTHER PUBLICATIONS

C. Mohan et al.; "Aries: A Transaction Recovery Method Supporting Fine-Granularity Locking and Partial Rollbacks Using Write-Ahead Logging"; ACM Transactions on Database Systems, vol. 17, No. 1, Mar. 1992, pp. 94-162.

(Continued)

*Primary Examiner*—Alina N. Boutah
(74) *Attorney, Agent, or Firm*—Fliesler Meyer LLP

(57) ABSTRACT

When an external user such as a trading partner makes a request into an access point of an application on an application server, that external user can be authenticated as a valid user on the system. The identity of the external user can then be switched to an internal system user identity, such as by pushing new user information on the user stack or by adding internal user context. This internal system user identity allows the user to access resources and applications on the application server that are not available to an external user. The use of this single internal system user identity allows for a single login process that can be used for all resources and applications on the server. The use of an internal user also prevents an external user from accessing those resources unless the user is first authenticated through a proper entry point.

19 Claims, 4 Drawing Sheets

U.S. PATENT DOCUMENTS

| | | | |
|---|---|---|---|
| 5,835,769 A | 11/1998 | Jervis et al. ............... 395/701 |
| 5,836,014 A | 11/1998 | Faiman, Jr. ............... 395/707 |
| 5,862,327 A | 1/1999 | Kwang et al. ............... 395/200 |
| 5,867,822 A | 2/1999 | Sankar |
| 5,933,838 A | 8/1999 | Lomet ............... 707/202 |
| 5,944,794 A * | 8/1999 | Okamoto et al. ............... 709/225 |
| 5,950,010 A | 9/1999 | Hesse et al. ............... 395/712 |
| 5,961,593 A * | 10/1999 | Gabber et al. ............... 709/219 |
| 5,966,535 A | 10/1999 | Bendikt et al. |
| 5,991,631 A * | 11/1999 | Jonsson ............... 455/459 |
| 6,012,083 A | 1/2000 | Savitzky et al. |
| 6,016,495 A | 1/2000 | McKeehan et al. |
| 6,018,730 A | 1/2000 | Nichols et al. |
| 6,023,578 A | 2/2000 | Birsan et al. |
| 6,023,722 A | 2/2000 | Colyer ............... 709/201 |
| 6,028,997 A | 2/2000 | Leymann et al. ............... 395/701 |
| 6,029,000 A | 2/2000 | Woolsey et al. |
| 6,044,217 A | 3/2000 | Brealey et al. ............... 395/701 |
| 6,067,548 A | 5/2000 | Cheng ............... 707/103 |
| 6,067,623 A * | 5/2000 | Blakley et al. ............... 713/201 |
| 6,070,184 A | 5/2000 | Blount et al. |
| 6,085,030 A | 7/2000 | Whitehead et al. ...... 395/200.33 |
| 6,092,102 A | 7/2000 | Wagner |
| 6,119,149 A | 9/2000 | Notani ............... 709/205 |
| 6,141,701 A | 10/2000 | Whitney |
| 6,141,868 A | 11/2000 | Schmidt et al. ............... 709/224 |
| 6,148,336 A | 11/2000 | Thomas et al. |
| 6,154,738 A | 11/2000 | Call |
| 6,189,044 B1 | 2/2001 | Thomson et al. |
| 6,212,546 B1 | 4/2001 | Starkovich et al. |
| 6,222,533 B1 | 4/2001 | Notani ............... 345/329 |
| 6,226,675 B1 | 5/2001 | Meltzer et al. |
| 6,226,788 B1 | 5/2001 | Schoening et al. |
| 6,230,287 B1 | 5/2001 | Pinard et al. ............... 714/31 |
| 6,230,309 B1 | 5/2001 | Turner ............... 717/1 |
| 6,237,135 B1 | 5/2001 | Timbol ............... 717/1 |
| 6,243,737 B1 | 6/2001 | Flanagan et al. |
| 6,269,373 B1 | 7/2001 | Apte et al. |
| 6,282,711 B1 | 8/2001 | Halpern et al. ............... 717/11 |
| 6,292,932 B1 | 9/2001 | Baisley et al. |
| 6,311,327 B1 | 10/2001 | O'Brien et al. |
| 6,324,681 B1 | 11/2001 | Sebesta ............... 717/1 |
| 6,330,569 B1 | 12/2001 | Baisley et al. |
| 6,334,114 B1 | 12/2001 | Jacobs et al. |
| 6,336,122 B1 | 1/2002 | Lee et al. ............... 707/204 |
| 6,338,064 B1 * | 1/2002 | Ault et al. ............... 707/9 |
| 6,343,265 B1 | 1/2002 | Glebov et al. |
| 6,345,283 B1 | 2/2002 | Anderson |
| 6,348,970 B1 | 2/2002 | Marx |
| 6,349,408 B1 | 2/2002 | Smith ............... 717/11 |
| 6,353,923 B1 | 3/2002 | Bogle et al. ............... 717/4 |
| 6,356,906 B1 | 3/2002 | Lippert et al. |
| 6,360,221 B1 | 3/2002 | Gough et al. |
| 6,360,358 B1 | 3/2002 | Elsbree et al. |
| 6,367,068 B1 | 4/2002 | Vaidyanathan et al. |
| 6,377,939 B1 | 4/2002 | Young |
| 6,393,605 B1 | 5/2002 | Loomans ............... 717/121 |
| 6,408,311 B1 | 6/2002 | Baisley et al. |
| 6,411,698 B1 | 6/2002 | Bauer et al. |
| 6,412,071 B1 * | 6/2002 | Hollander et al. ............... 726/23 |
| 6,438,594 B1 | 8/2002 | Bowman-Amuah |
| 6,445,711 B1 | 9/2002 | Scheel et al. |
| 6,463,503 B1 | 10/2002 | Jones et al. ............... 711/114 |
| 6,470,364 B1 | 10/2002 | Prinzing |
| 6,516,322 B1 | 2/2003 | Meredith |
| 6,519,764 B1 * | 2/2003 | Atkinson et al. ............... 717/120 |
| 6,549,949 B1 | 4/2003 | Bowman-Amuah ......... 709/236 |
| 6,560,636 B2 | 5/2003 | Cohen et al. |
| 6,560,769 B1 | 5/2003 | Moore et al. |
| 6,567,738 B2 | 5/2003 | Gopp et al. |
| 6,584,454 B1 | 6/2003 | Hummel, Jr. et al. |
| 6,594,693 B1 | 7/2003 | Borwankar ............... 709/219 |
| 6,594,700 B1 | 7/2003 | Graham et al. |
| 6,601,113 B1 | 7/2003 | Koistinen et al. |
| 6,604,198 B1 * | 8/2003 | Beckman et al. ............... 713/167 |
| 6,609,115 B1 | 8/2003 | Mehring et al. |
| 6,615,258 B1 | 9/2003 | Barry et al. |
| 6,636,491 B1 * | 10/2003 | Kari et al. ............... 370/328 |
| 6,637,020 B1 | 10/2003 | Hammond |
| 6,643,652 B2 | 11/2003 | Helgeson et al. |
| 6,654,932 B1 | 11/2003 | Bahrs et al. |
| 6,678,518 B2 | 1/2004 | Eerola |
| 6,684,388 B1 | 1/2004 | Gupta et al. |
| 6,687,702 B2 | 2/2004 | Vaitheeswaran et al. |
| 6,687,848 B1 | 2/2004 | Najmi |
| 6,721,740 B1 | 4/2004 | Skinner et al. |
| 6,721,779 B1 | 4/2004 | Maffeis |
| 6,728,884 B1 * | 4/2004 | Lim ............... 726/12 |
| 6,732,237 B1 | 5/2004 | Jacobs et al. ............... 711/119 |
| 6,748,420 B1 | 6/2004 | Quatrano et al. |
| 6,754,884 B1 | 6/2004 | Lucas et al. |
| 6,757,689 B2 | 6/2004 | Battas et al. |
| 6,789,054 B1 | 9/2004 | Makhlouf |
| 6,795,967 B1 * | 9/2004 | Evans et al. ............... 719/310 |
| 6,799,718 B2 | 10/2004 | Chan et al. |
| 6,802,000 B1 * | 10/2004 | Greene et al. ............... 713/168 |
| 6,804,686 B1 | 10/2004 | Stone et al. ............... 707/104.1 |
| 6,823,495 B1 | 11/2004 | Vedula et al. |
| 6,832,238 B1 | 12/2004 | Sharma et al. |
| 6,836,883 B1 | 12/2004 | Abrams et al. |
| 6,847,981 B2 | 1/2005 | Song et al. |
| 6,850,979 B1 | 2/2005 | Saulpaugh et al. |
| 6,859,180 B1 | 2/2005 | Rivera |
| 6,874,143 B1 | 3/2005 | Murray et al. |
| 6,889,244 B1 | 5/2005 | Gaither et al. |
| 6,915,519 B2 | 7/2005 | Williamson et al. |
| 6,918,084 B1 | 7/2005 | Slaughter et al. |
| 6,922,827 B2 | 7/2005 | Vasilik et al. |
| 6,931,545 B1 * | 8/2005 | Ta et al. ............... 726/10 |
| 6,950,872 B2 | 9/2005 | Todd, II |
| 6,959,307 B2 | 10/2005 | Apte |
| 6,963,914 B1 | 11/2005 | Breitbart et al. |
| 6,971,096 B1 | 11/2005 | Ankireddipally et al. |
| 6,976,086 B2 | 12/2005 | Sadeghi et al. |
| 7,000,219 B2 | 2/2006 | Barrett et al. |
| 7,017,146 B2 | 3/2006 | Dellarocas et al. |
| 7,039,919 B1 * | 5/2006 | Hunt ............... 719/316 |
| 7,043,722 B2 | 5/2006 | Bau, III |
| 7,051,072 B2 | 5/2006 | Stewart et al. |
| 7,051,316 B2 | 5/2006 | Charisius et al. |
| 7,054,858 B2 | 5/2006 | Sutherland |
| 7,062,718 B2 | 6/2006 | Kodosky et al. |
| 7,069,507 B1 | 6/2006 | Alcazar et al. |
| 7,072,934 B2 | 7/2006 | Helgeson et al. |
| 7,073,167 B2 | 7/2006 | Iwashita |
| 7,076,772 B2 | 7/2006 | Zatloukal |
| 7,096,422 B2 | 8/2006 | Rothschiller et al. |
| 7,107,578 B1 | 9/2006 | Alpern |
| 7,111,243 B1 | 9/2006 | Ballard et al. |
| 7,117,504 B2 | 10/2006 | Smith et al. |
| 7,127,704 B2 | 10/2006 | Van De Vanter et al. |
| 7,143,186 B2 | 11/2006 | Stewart et al. |
| 7,146,422 B1 | 12/2006 | Marlatt et al. |
| 7,155,705 B1 | 12/2006 | Hershberg et al. |
| 7,184,967 B2 | 2/2007 | Mital et al. |
| 7,240,331 B2 | 7/2007 | Vion-Dury et al. |
| 7,260,599 B2 | 8/2007 | Bauch et al. |
| 2001/0032263 A1 | 10/2001 | Gopal et al. |
| 2002/0004848 A1 | 1/2002 | Sudarshan et al. |
| 2002/0010781 A1 | 1/2002 | Tuatini |
| 2002/0010803 A1 | 1/2002 | Oberstein et al. |
| 2002/0016759 A1 | 2/2002 | Macready et al. |
| 2002/0049788 A1 | 4/2002 | Lipkin et al. |
| 2002/0073080 A1 | 6/2002 | Lipkin |

| | | | |
|---|---|---|---|
| 2002/0073236 A1 | 6/2002 | Helgeson et al. | |
| 2002/0073320 A1* | 6/2002 | Rinkevich et al. | 713/183 |
| 2002/0073396 A1 | 6/2002 | Crupi et al. | |
| 2002/0078365 A1* | 6/2002 | Burnett et al. | 713/200 |
| 2002/0083075 A1 | 6/2002 | Brummel et al. | |
| 2002/0111922 A1 | 8/2002 | Young et al. | |
| 2002/0120685 A1 | 8/2002 | Srivastava et al. | |
| 2002/0143960 A1* | 10/2002 | Goren et al. | 709/229 |
| 2002/0152106 A1 | 10/2002 | Stoxen et al. | |
| 2002/0161826 A1 | 10/2002 | Arteaga et al. | |
| 2002/0165936 A1 | 11/2002 | Alston et al. | |
| 2002/0174178 A1 | 11/2002 | Stawikowski | |
| 2002/0174241 A1 | 11/2002 | Beged-Dov et al. | |
| 2002/0184145 A1 | 12/2002 | Sijacic et al. | |
| 2002/0184610 A1 | 12/2002 | Chong et al. | |
| 2002/0194244 A1 | 12/2002 | Raventos | |
| 2002/0194267 A1 | 12/2002 | Flesner et al. | |
| 2002/0194495 A1 | 12/2002 | Gladstone et al. | |
| 2003/0004746 A1 | 1/2003 | Kheirolomoom et al. | |
| 2003/0005181 A1 | 1/2003 | Bau, III et al. | |
| 2003/0014439 A1 | 1/2003 | Boughannam | |
| 2003/0016811 A1* | 1/2003 | Milton | 379/245 |
| 2003/0018661 A1 | 1/2003 | Darugar | |
| 2003/0018665 A1 | 1/2003 | Dovin et al. | |
| 2003/0018832 A1 | 1/2003 | Amirisetty et al. | |
| 2003/0023596 A1* | 1/2003 | Boudreau | 707/9 |
| 2003/0023957 A1 | 1/2003 | Bau, III et al. | |
| 2003/0028364 A1 | 2/2003 | Chan et al. | |
| 2003/0028579 A1 | 2/2003 | Kulkarni et al. | |
| 2003/0028637 A1* | 2/2003 | Gross | 709/225 |
| 2003/0041198 A1* | 2/2003 | Exton et al. | 710/200 |
| 2003/0043191 A1 | 3/2003 | Tinsley et al. | |
| 2003/0046266 A1 | 3/2003 | Mullins et al. | |
| 2003/0046591 A1* | 3/2003 | Asghari-Kamrani et al. | 713/202 |
| 2003/0051066 A1 | 3/2003 | Pace et al. | |
| 2003/0055868 A1 | 3/2003 | Fletcher et al. | |
| 2003/0055878 A1 | 3/2003 | Fletcher et al. | |
| 2003/0074217 A1 | 4/2003 | Beisiegel et al. | |
| 2003/0074467 A1 | 4/2003 | Oblak et al. | |
| 2003/0079029 A1* | 4/2003 | Garimella et al. | 709/229 |
| 2003/0084203 A1 | 5/2003 | Yoshida et al. | |
| 2003/0110117 A1 | 6/2003 | Saidenberg et al. | |
| 2003/0110446 A1 | 6/2003 | Nemer | |
| 2003/0126136 A1 | 7/2003 | Omoigui | |
| 2003/0149791 A1 | 8/2003 | Kane et al. | |
| 2003/0167358 A1 | 9/2003 | Marvin et al. | |
| 2003/0191976 A1* | 10/2003 | Cyran et al. | 713/340 |
| 2003/0196168 A1 | 10/2003 | Hu | |
| 2003/0233631 A1 | 12/2003 | Curry et al. | |
| 2004/0019645 A1 | 1/2004 | Goodman et al. | |
| 2004/0040011 A1 | 2/2004 | Bosworth et al. | |
| 2004/0068568 A1 | 4/2004 | Griffin et al. | |
| 2004/0078373 A1 | 4/2004 | Ghoneimy et al. | |
| 2004/0103406 A1 | 5/2004 | Patel | |
| 2004/0133660 A1 | 7/2004 | Junghuber et al. | |
| 2004/0148336 A1 | 7/2004 | Hubbard et al. | |
| 2004/0204976 A1 | 10/2004 | Oyama et al. | |
| 2004/0216086 A1 | 10/2004 | Bau | |
| 2004/0225995 A1 | 11/2004 | Marvin et al. | |
| 2004/0260715 A1 | 12/2004 | Mongeon et al. | |
| 2005/0050068 A1 | 3/2005 | Vaschillo et al. | |
| 2005/0066332 A1* | 3/2005 | Durai | 718/108 |
| 2005/0262086 A1* | 11/2005 | Ta et al. | 707/9 |
| 2005/0278585 A1 | 12/2005 | Spencer | |
| 2006/0206856 A1 | 9/2006 | Breeden et al. | |
| 2006/0234678 A1* | 10/2006 | Juitt et al. | 455/411 |
| 2007/0038500 A1 | 2/2007 | Hammitt et al. | |

FOREIGN PATENT DOCUMENTS

| | | |
|---|---|---|
| EP | 1 006 443 A2 | 6/2000 |
| EP | 1 061 445 A2 | 12/2000 |
| WO | 99/23558 | 5/1999 |
| WO | 00/29924 | 5/2000 |
| WO | 01/90884 A2 | 11/2001 |

OTHER PUBLICATIONS

U.S. Appl. No. 10/271,194, filed Oct. 15, 2002, Mitch Upton.
U.S. Appl. No. 10/404,296, filed Apr. 1, 2003, Mike Blevins.
U.S. Appl. No. 10/404,552, filed Apr. 1, 2003, Mike Blevins.
U.S. Appl. No. 10/447,778, filed May 29, 2003, David Wiser et al.
Paul, Laura Gibbons, "RosettaNet: Teaching businesses to work together", Oct. 1, 1999. pp. 1-4.
"Introducing Microsoft DotNet"; by ChristopheLauer, Jul. 2, 2002; http://web.archive.org/web/20020702162429/http://www.freevbcode.com/ShowCode.asp?ID=2171; pp. 1-10.
Hewlett-Packard, *HP Application Server, Technical Guide Version 8.0*, HP, Nov. 15, 2001, pp. 1-234.
Sun Microsystems, *iPlanet Application Server 6.0 White Paper*, iPlanet E-Commerce Solutions, May 25, 2000, pp. 1-104.
Enrique Duvos & Azer Bestavros, *An Infrastructure for the Dynamic Distribution of Web Application and Services*, Department of Computer Science Boston University, Dec. 2000, pp. 1-104.
Ed Roman & Rickard Öberg, *The Technical Benefits of EJB and J2EE Technologies over COM+ and Windows DNA*, Enterprise Edition (J2EE) Technologies, Dec. 1999, pp. 1-24.
Marcello Mariucci, *Enterprise Application Server Development Environments*, University of Stuttgart, Oct. 10, 2000, pp. 1-30.
U.S. Appl. No. 10/021,855, filed Dec. 13, 2001, Bisson et al.
U.S. Appl. No. 60/347,919, filed Oct. 18, 2001, Upton et al.
U.S. Appl. No. 60/377,157, filed May 2, 2002, Blevins et al.
U.S. Appl. No. 60/392,237, filed Jun. 27, 2002, Wiser et al.
U.S. Appl. No. 60/376,906, filed May 1, 2002, Blevins et al.
Kunisetty, "Workflow Modeling and Simulation Using an Extensible Object-Oriented Knowledge Base Management System" CiteSeer, 1996, pp. 1-60.
Van Der Aalst et al., "Verification of XRL: An XML-Based Workflow Language" IEEE, Jul. 2001, pp. 427-432.
Blake, "Rule-Driven Coordination Agents: A Self-Configurable Agent Architecture for Distributed Control" IEEE, Mar. 2001; pp. 271-277.
Dahalin et al., "Workflow Interoperability Using Extensible Markup Language (XML)" IEEE, Jul. 2002; pp. 513-516.
Blake; Rule-Driven Coordination Agents: "A Self-Configurable Agent Architecture for Distributed Control" IEEE, Mar. 2001, pp. 271-277.
Dahalin et al., "Workflow Interoperability Using Extensible Markup Language (XML)", IEEE, Jul. 2002, pp. 513-516.
Kunisetty, Workflow Modeling and Simulation Using and Extensible Object-Oriented Knowledge Based Management System, CiteSeer. 1996 pp. 1-60.
Lauer, Christophe "Introducing Microsoft DotNet" Jul. 2, 2002, pp. 4-5.
Van Der Aalst et al., Verification of XRL: An XML-Based Workflow Language, IEEE, Jul. 2001, pp. 427-432.
Embury, et al., "Assisting the Comprehension of Legacy Transactions," Proceedings of the Eighth Working Conference on Reverse Engineering, Oct. 2-5, 2001, pp. 345-354.
Mays, et al., "A Persistent Store for Large Shared Knowledge Bases," IEEE Transactions on Knowledge and Data Engineering, vol. 3, No. 1, Mar. 1991, pp. 33-41.
Tang, et al., "Integrating Remote Invocation and Distributed Shared State," Proceedings of the 18th International Parallel and Distributed Processing Symposium, (IPDPS '04), Apr. 26-30, 2004, 10 pages.
Liebmann, et al., "Adaptive Data Dissemination and Caching for Edge Service Architectures built with the J2EE," 2004 ACM Symposium on Applied Computing, Nicosia, Cyprus, Mar. 14-17, 2004, pp. 1717-1724.
Sosnoski, "XML and Java technologies: Data binding, Part 1: Code generation approaches—JAXB and more," IBM, Jan. 1, 2003, http://www-128.ibm.com/developerworks/library/x-databdopt/index.html, pp. 1-11.
Java Debug Interface—definition, retrieved from <URL http://java.sun.com/j2se/1.4.2/docs/guide/jpda/jdi/overview-summary.html on Feb. 21, 2007, pp. 1-3.

Chen, et al., "eCo Architecture for Electronic Commerce Interoperability," CommerceNet eCo Framework Project, Jun. 29, 1999, CommerceNet, Inc., pp. 1-107.

Kilgore, "Multi-Language, Open-Source Modeling Using the Microsoft .NET Architecture," Proceedings of the 2002 Winter Simulation Conference, Dec. 8-11, 2002, IEEE, vol. 1, pp. 629-633.

Alonso, G. et al., "Advanced Transaction Models in Workflow Contexts," Feb. 1996, Proceedings of 12th International Conference on Data Engineering, retrieved from http://citeseer.ist.psu.edu/alonso96advanced.html.

Van Der Aalst, W.M.P. et al., "XML Based Schema Definition for Support of Inter-Organizational Workflow," 2000, University of Colorado and University of Eindhoven report, retrieved from http://citeseer.ist.psu.edu/vanderaalst00xml.html.

Plaindoux, Didier, "XML Transducers in Java," May 2002, The Eleventh International World Wide Web Conference, retrieved from http://www.2002.org/CDROM/poster/132/index.html.

Microsoft, "Microsoft.net Framework," 2001, Microsoft Corporation, pp. 1-50.

Willink, Edward D., "Meta-Compilation for C++," Jan. 2000, University of Surrey, p. 362.

Allamaraju et al., "Professional Java Server Programming J2EE 1.3 Edition," Sep. 2001, WROX, XP002442953, pp. 1009-1057.

Sun Microsystems, Inc., "J2EE Connector Architecture 1.0," Aug. 2001, XP002442954, retrieved from the Internet: http://java.sun.com/j2ee/connector/download.html>, pp. 1-179.

Supplementary European Search Report dated Aug. 8, 2007, for European Patent Application No. EP 02784131.1, 4 pages.

Hp, "hp application server" developer's guide, version 8.0, 1999-2001, pp. 27-81, 127, 160, 195-271.

Bugunovic, Nikola, "A Programming Model for Composing Data Flow Collaborative Applications," 1999 IEEE, retrieved Apr. 10, 2007.

Sung, Sy et al., "A Multimedia Authoring Tool for the Internet," pp. 304-308, 1997 IEEE, retrieved Apr. 10, 2007.

Smith, Milton et al., "Marching Towards a Software Reuse Future," pp. 62-72, Nov./Dec. 1994, ACM, retrieved Apr. 10, 2007.

Bea, Transforming Data Using Xquery Mapper, 2006, BEA AquaLogic Service Bus 2.0 Documentation, pp. 1-19.

Stylus Studio, Xquery Mapper, 2007, Stylus Studios, pp. 1-6.

Altova, XML-to-XML Mapping, 2007, Altova, pp. 1-3.

Jamper, Jamper-Java XML Mapper, 2007, Sourceforge, pp. 1-4.

* cited by examiner

US 7,552,222 B2

SINGLE SYSTEM USER IDENTITY

CLAIM OF PRIORITY

This application claims priority to U.S. Provisional Patent Application No. 60/392,144, filed Jun. 27, 2002, entitled "SINGLE SYSTEM USER IDENTITY," incorporated herein by reference.

CROSS-REFERENCED CASES

The following applications are cross-referenced and incorporated herein by reference:

U.S. Provisional Application No. 60/392,237 entitled "System and Method for Maintaining Transactional Persistence," by David Wiser et al, filed Jun. 27, 2002.

U.S. Provisional Application No. 60/376,906 entitled "Collaborative Business Plug-in Famework," by Mike Blevins, filed May 1, 2002.

U.S. Provisional Application No. 60/377,157 entitled "System and Method for Collaborative Business Plug-ins," by Mike Blevins, filed May 2, 2002.

U.S. Provisional Application No. 60/347,919 entitled "Application View," by Mitch Upton et al., filed Oct. 18, 2001.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present invention relates generally to data security and user authentication.

BACKGROUND

In many e-business systems, businesses would like to maintain tight control over which people have access to sensitive information, such as sales, product, or customer information in a legacy database. In conventional systems this is not an issue, as anyone given access to a system has access to all resources and data on that system. In an enterprise system, any applications can be placed behind a firewall. Certain people are given access to the system through the firewall, but again have access to all resources once inside the firewall. This requires a system administrator to keep a close watch on who is accessing these resources.

Existing e-business solutions for managing business workflow, as well as for enabling standardized business-to-business (B2B) messaging, utilize separate system user identities for each of these applications. A user identity for a business process management (BPM) component provides a user with access to all BPM resources, such as JDBC (Java Database Connectivity) and Enterprise JavaBeans (EJBs). A user identity for B2B provides a B2B user with access to B2B resources, such as messaging resources with possible exceptions such as servlets and JavaServer Pages (JSPs). Administrators for systems using both of these applications have to manage these separate identities. This does not provide for ease of use.

Systems using such applications can have problems with unauthorized users accessing the system using one of these user identities. For example, an unauthorized user could access system data through a system node if that unauthorized user obtained a proper username and password. The unauthorized user could simply generate a request that appears to the system to be an authenticated request.

Some systems have addressed such security concerns by "locking down" the system. For instance, certain systems include an additional access code or flag that provides the system with the ability to allow or disallow Java naming and directory interface (JNDI) lookups. This is a potential problem point, however, as systems may operate in a cluster with more than one node. One of these nodes may want to do a JNDI lookup on another node, which will not be possible if JNDI lookups are locked down. It also will be impossible to use other features of the system. Many system components and resources are interrelated, and lockdown will cause problems for many of these components.

BRIEF SUMMARY

Systems and methods in accordance with the present invention utilize a single system user identity to provide a user with access to resources and applications on an application server. There can be several applications running on an application server, with each application having at least one access mechanism through which an external user can access the application and/or application server. A validation mechanism can be used to validate an external user, such as by comparing information provided by the user against user information in a database. Once an external user is validated, the validation mechanism can switch the identity of the external user to an internal system user identity. Once the user is switched to an internal system user, that user can access any application and/or resource on the application server to which an internal user is granted access. The identity of the user can be switched by pushing internal user information on the user stack for the external user, or by adding internal user context to the external user identity, for example. This switch can be done at any appropriate time, such as when an external user is first validated or when an external user first attempts to access a resource or application requiring an internal user identity.

Other features, aspects, and objects of the invention can be obtained from a review of the specification, the figures, and the claims.

DETAILED DESCRIPTION

Figure 1:
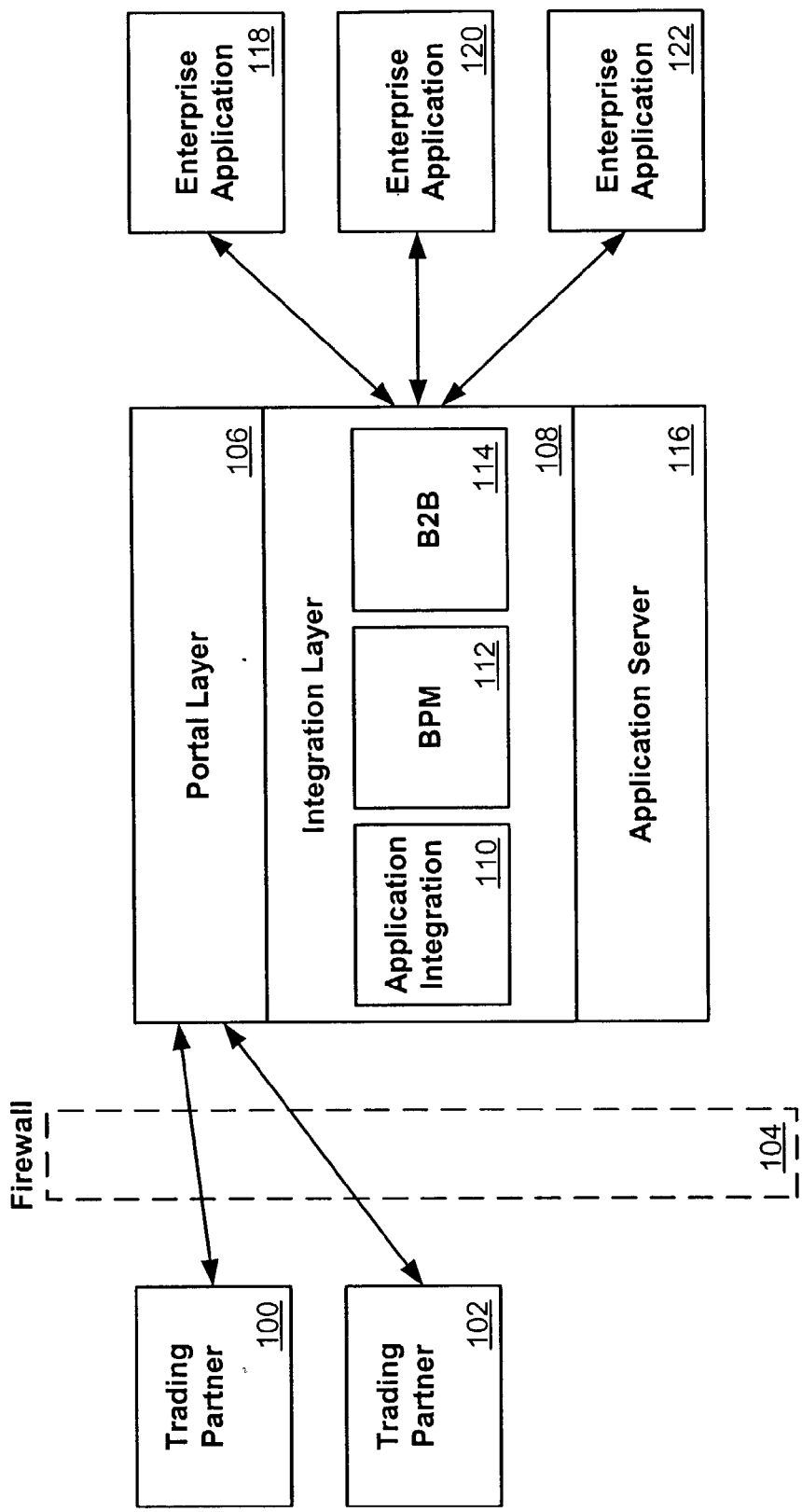
FIG. 1 is a diagram of a system in accordance with one embodiment of the present invention.

An integration application can be built, or layered, on top of an application server 116, as shown in FIG. 1. Such an integration layer 108 can consist of a number of applications or components, such as may include a business-to-business (B2B) component 114, a business process management (BPM) component 112, and an application integration (AI) component 110. Other components, such as eXtreme Programming (XP) components, can also be included in the integration layer. XP is a relatively new business standard approach to rapidly developing high-quality, high-value software for customers.

Trading partners 100,102 can gain access to the system through access points, such as may be contained in a portal layer 106 built on top of the integration layer 108. Once a trading partner 100, 102 is authenticated, that trading partner or user can make requests into enterprise applications 118, 120, 122, for example, through the integration layer 108.

Figure 2:
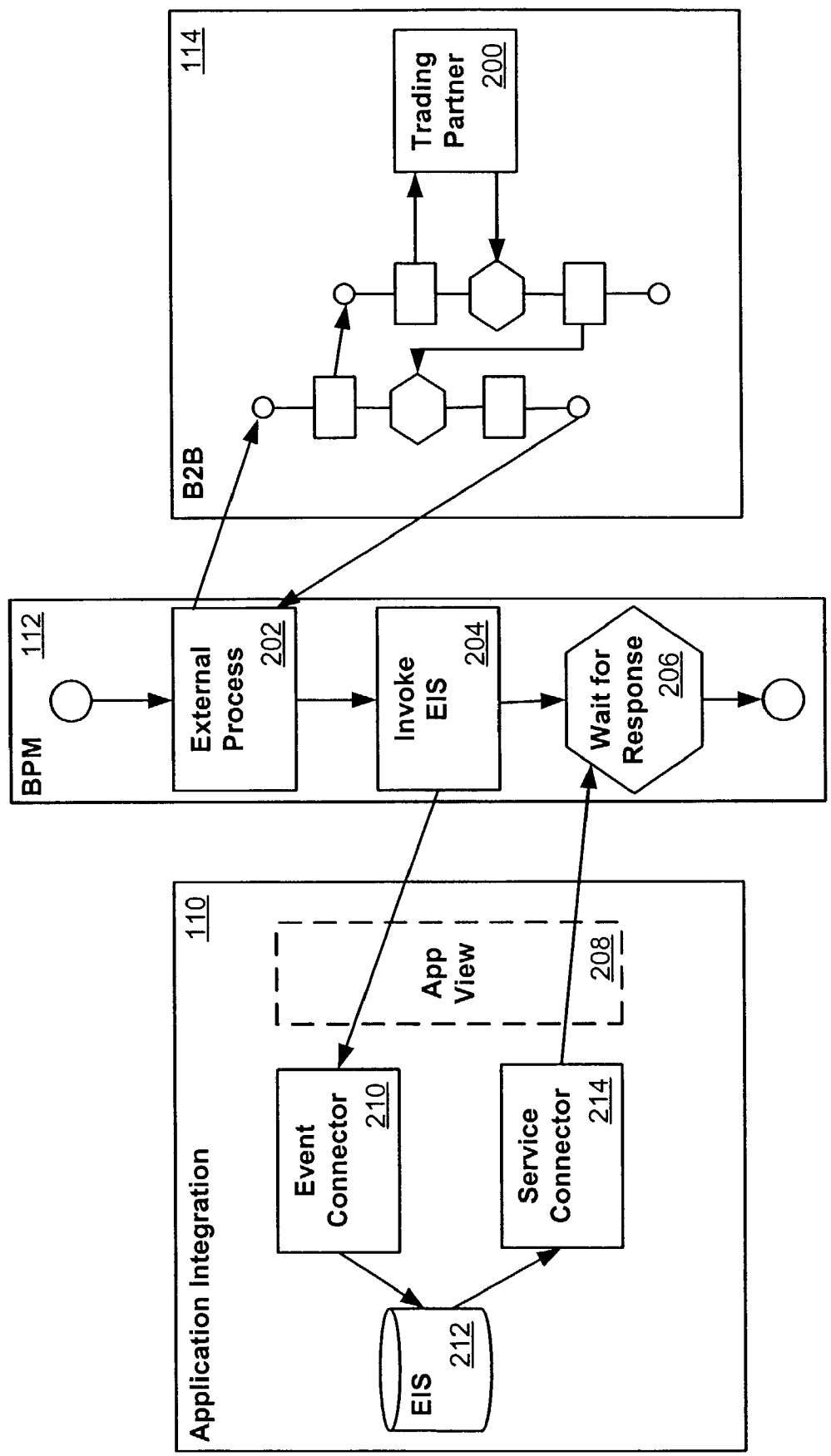
FIG. 2 is flowchart for a method that can be used with the system of FIG. 1.

In order to process such a request, the integration components can communicate with each other. FIG. 2 shows one example of a communication between an application integration component 110, a business process management component 112, and a business-to-business component 114. A trading partner 200 can send a request to the system that is received by a B2B component 114. The B2B component 114 can direct the request to the appropriate business processes in order to process the request. A BPM component 112 can manage the workflow for the request. From an external process 202, the BPM component can make a call to invoke an enterprise information system (EIS) 204. The call to invoke EIS 204 can pass the request to an application integration (AI) component 110. The AI component can contain an application view 110, which provides access to an event connector 210 for the EIS database or datastore 212. Once the request is processed in the database 212, a service connector 214 passes the response back through the application view 208 to the BPM component 112, which is waiting for a response 206. In the case of asynchronous messaging, the BPM component may not be waiting for a response, but can retrieve the response later, after the presence of the response is detected.

Once the BPM component gets the response, the response can be passed back to the external process 202 and then to the trading partner 200 through the B2B component 114. In prior systems, the user would need a valid username and password for each of the B2B 114, BPM 112, and AI 110 components.

As trading partners often make requests into the system, it is desirable to limit their access to only those resources in the system which they might need, and to which their access is desired by the business or entity owning the data or resources. In processing these requests, a system administrator may not wish to give trading partners any additional capabilities or resource access. Simply because these users may be valid users on the system, and may each have a valid user identity, does not mean that the trading partners should have access to everything on the system. One way to control user access is to only provide System users with access to certain resources, and not simply any valid users on the system.

Figure 3:
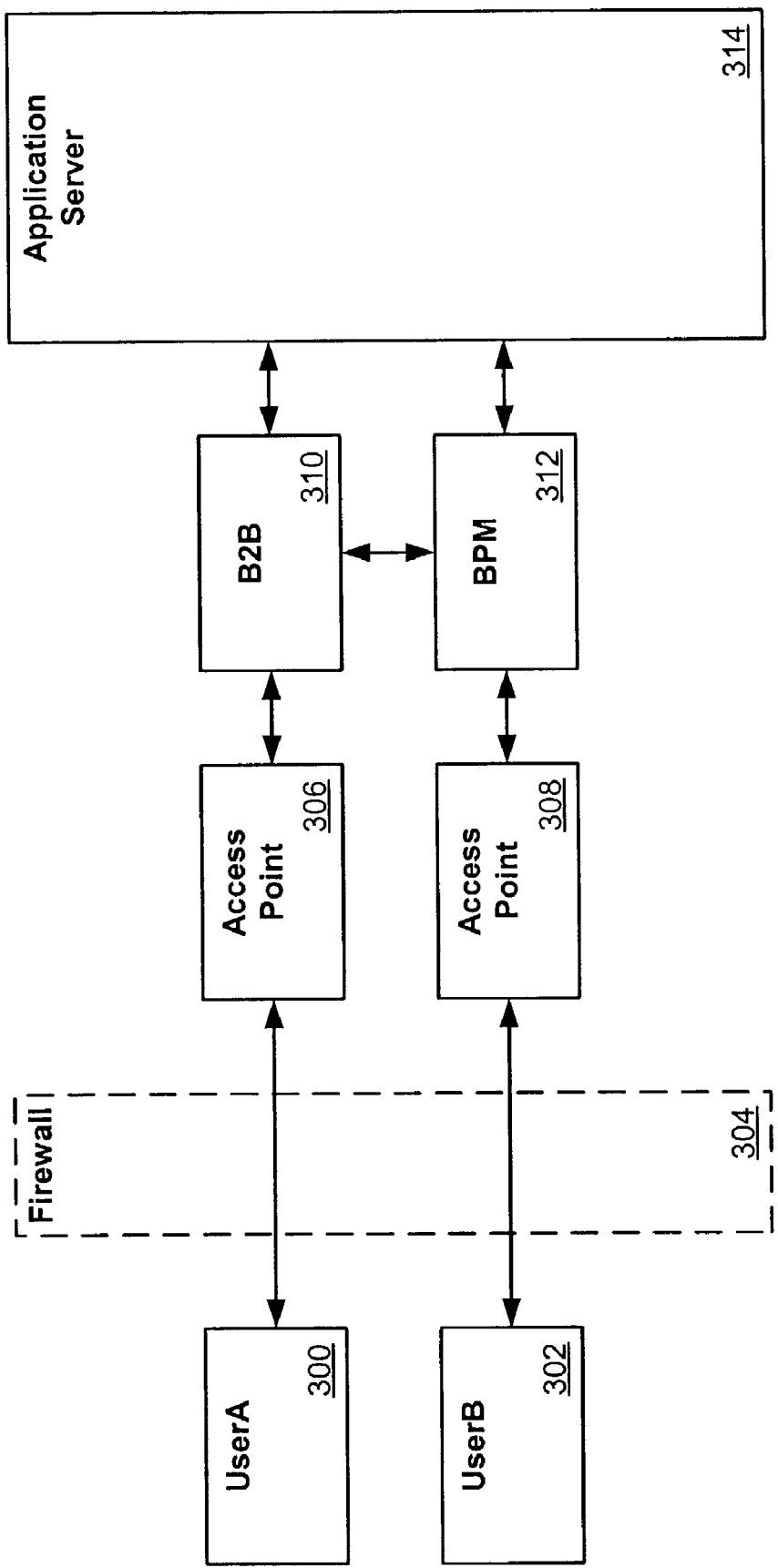
FIG. 3 is a diagram of a system in accordance with another embodiment of the present invention.

A system and method in accordance with one embodiment of the present invention uses a single system user identity that provides access to all these integration components, as well as any associated resources or objects. As shown in FIG. 3, the use of a single system identity to authenticate a user can allow components, such as BPM 312 and B2B 310 components, to communicate without having separate logins or user authentications. Components can have multiple access points 306, 308, such as a series of transport servlets that allow a request to be transported into the system. Access to the B2B component can also be obtained through a BPM component. Through BPM, a user can send a message to B2B using a B2B plugin or B2B interface, for example. Another access point could be a B2B console that provides for user login.

Figure 4:
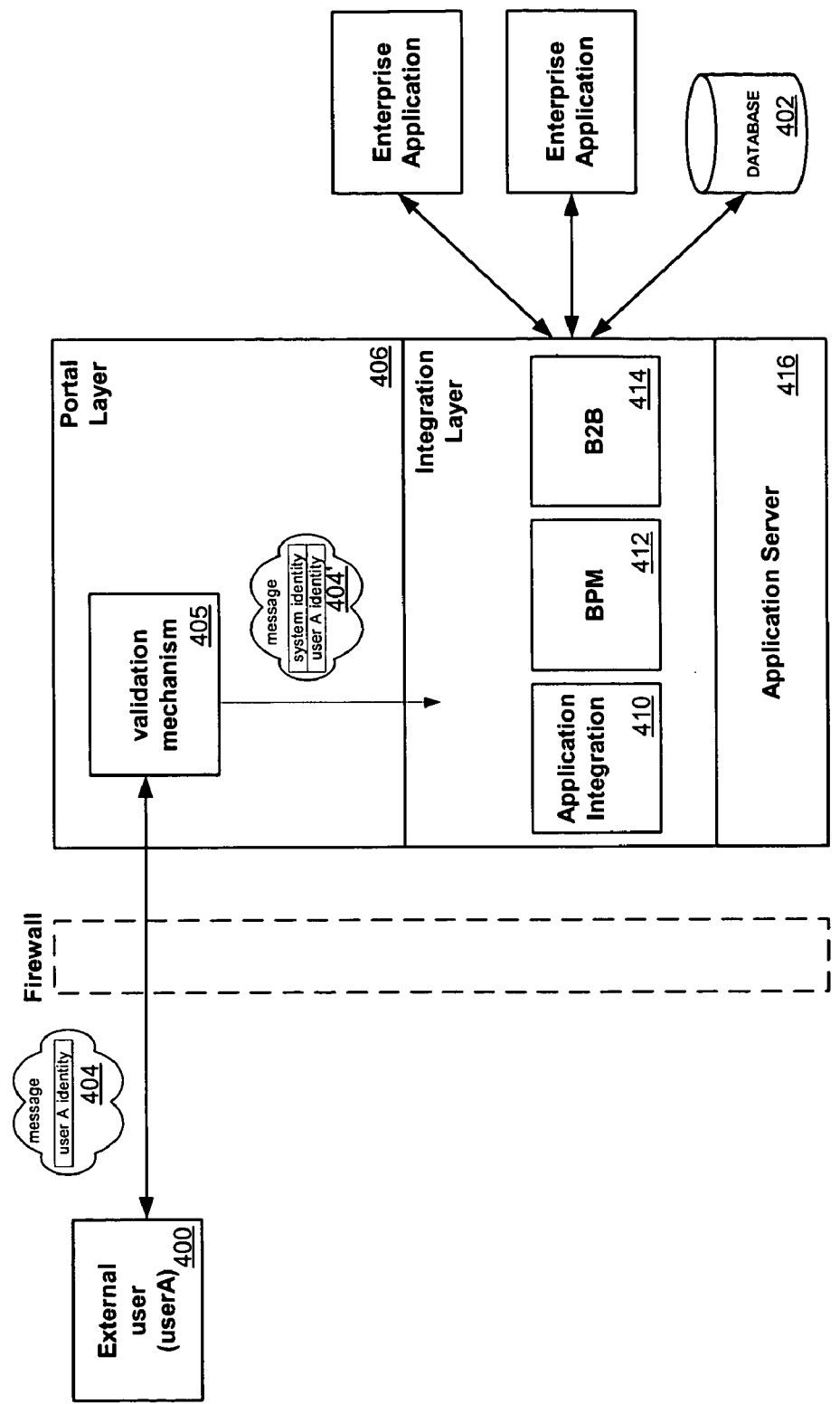
FIG. 4 is a diagram showing a validation mechanism of one embodiment.

As shown in FIG. 4, Since a single system user identity allows a user to accomplish tasks such as making requests against a system database 402 and acting on a B2B depository, systems and methods in accordance with the present invention secure the access points for B2B 412, BPM 414, and potentially any other integration component to avoid the processing of unauthenticated requests. For example, a B2B user 400 can be authenticated when that user enters through one of the B2B access points. Once the user is authenticated at one of these access points, such as by verifying the username and password information provided by the user against a table in a database, the identity of the user can be "switched" to an internal user or system user. This switched user shall be identified from this point forward as simply a "System" user.

The use of a single system user identity can be advantageous, as components such as B2B 414 and BPM 412 components can have, or provide access to, a number of resources. A message 404 can be required to access resources for both these components. These resources can include, for example, databases, queues and administrative frameworks using MBeans. As a message travels through these components, the identity of the user initiating that message is propagated with the message. Additional identity information can also be propagated with the message, which can be referred to as System user information. This System user information allows a user to have access to any and/or all of the resources which these components provide, where individual component user identities may only provide access to resources for the respective component.

The use of a single system user identity also means that system administrators do not have to configure all component resources for each user that may be accessing these systems. For external access, all that may need to be configured are the appropriate policies that allow a user to be verified and enter the system. After a user passes through an access point and is verified, the system can act on behalf of that user by attaching a System user identity to that user. This approach can provide protection throughout the entire application server system, including components such as B2B 414 and BPM 412.

An entire runtime system can be controlled under a single user identity. For each valid incoming user, that incoming user can be required to be switched to a System user before the system will process the request. For example, if a valid trading partner comes into the system with the username of "UserA", UserA will be a valid username on a given application server. UserA can gain system access through any system entry point 405. If UserA comes through a proper entry point, UserA can be authenticated and switched to an internal user identifier, such as System. Once this switch is completed, the user will appear to the system as System, instead of UserA. The System user can be given access to specified system resources that are not available to UserA. From this point forward the external user will be referred to as UserA. References "System" and "UserA" are used for convenience and demonstration only, and are not intended to limit the possible designation or naming schemes that can be used for internal and/or external users.

One advantage of a single system user identity is that an application server can provide access control that is well-defined. Even though UserA may be a valid user on the system, access to any resource on a machine can be limited to System users. UserA 400 can still be granted access to certain resources without the switch, but may not be able to access a critical resource, such as a database resource 402. A user logged into the system as an external user cannot then access certain controlled resources.

The switching of a user identity from an "external" user to an "internal" user can be much more than simply a transformation of the username. As a user enters an entry point, or access point, that user can be authenticated and another user can be pushed on top of that user. This switch results in resource access being granted to this "new" user. The pushing of a new user on top of the existing user prevents an unauthorized user, having obtained a valid username and password, from coming through a specified entry point and doing a JNDI lookup. A JNDI lookup allows a user to lookup a resource on the application server. If a system does not require a system user to be pushed on top of an external user in order to do a lookup, that external user 400 could access the resource directly from any entry point or node in the system. When an available thread is selected for a message, context can be loaded for the thread which includes a user stack in the thread address space. The "new" or additional user information can be pushed on top of this user stack to identify the source of the thread of execution.

The user can therefore be switched by creating an authenticated user context for valid users on a platform. Each time a resource or component is to be accessed for a particular user, this context can be pushed on the user stack, and the new user identity can be assumed from that point forward. It can be beneficial, for security reasons, to be able to lock down the server for a given internal user. Even though each system component can have a set of valid users, it can be more convenient and can offer more control to utilize a single system user identity to access resources across the system.

Even if a single system user identity does not provide any additional protection for every system component, an internal username can provide access control for an integration layer 408. Even if someone knows a valid username and password on the application server 416, this valid username and password will not necessarily grant access to the integration layer 408. At any integration entry point, an error can be thrown and a connection closed for an external user request, as only internal users are granted access to internal integration resources. Any external access can be prohibited.

External users can be prevented from sidestepping an entry point, such as a portal 406, and taking advantage of other channels to access application server resources. These users should not be allowed to have read/write access to information in a database, for example, unless they are first authenticated as having those privileges. As the entire runtime system can run on a single user, there is no need for multiple authentications.

One entry point that can be used for a B2B component 414 is a transport servlet. A transport servlet can be configured to receive a message from across a network and process that message. Other access points can include, for example, BPM studios and system user interfaces, which can each include a user login screen. When users come in through these tools, or access points, the users can have access to a limited set of tasks. As mentioned, a BPM studio can allow a user to login using a valid username and password. This studio can be implemented as a tool that allows a user to create a workflow process, or to select an exsisting process. User authentication can be done in a studio, before the user is switched to an internal user.

Once a single system user identity is implemented for various integration components on an application server 416, there is the possibility of a message coming into a worklist or studio, typically a BPM task, and actually generating a B2B message. A message coming into B2B can itself trigger a workflow, for example, and many other inter-component exchanges are possible. Additional access controls can be defined to account for these inter-component exchanges. For example, there can be a set of permission groups in BPM that can indicate whether a user can create a template, process a workflow, delete a template, or monitor instances. A valid system user can be defined as a member of this group, which can then have access to all tasks in the set.

In order for a studio to work with these templates, it can first be determined whether a user is part of this group. This can be configured automatically so that the user gets all privileges to the set of tasks. If that user wants to create a template from the database, however, that user may need additional privileges. Until the user calls a runtime service 405 where the switch is done, for example, the user is still external user UserA. These extra privileges can be given to users directly, which can provide undesirable exposure, or the extra privileges can be provided to internal users which have undergone the switch to an internal System user.

Not every user needs to be automatically switched when entering through an access point, or entry point 405. For instance, if a user wants to create a workflow template, and that user belongs to a group that has the privilege to create a workflow template, there is no need to push an internal identifier on that user before that user accesses the appropriate bean or resource. If a call gets all the way to this resource, a check can have already been done to ensure the incoming user can do that task. The request can assume an identity that has higher privileges than those provided by the transport servlet, such as requests that are coming over the network using a secure sockets layer protocol (SSL) for authentication. The certificate that a website uses to make the SSL request can be mapped to a user, so the request can be certificate-based instead of password-based. For users verified by SSL, there may not be a need to push additional authentication.

EJBs

In order to perform various tasks, a system can utilize a set of EJBs, as well as a common repository, such as may utilize JDBC. Once authenticated, a user can choose a task such as "create workflow." This task can be accomplished through a call to an EJB. Each EJB, as well as the associated deployment descriptor, can have access to, or can contain, the system identities. This allows the EJBs to process requests only for System users. Once a user is inside an EJB and executing a task such as accessing the database to store and retrieve information, the username can actually be the internal System username.

Integration Components

In an e-business environment, collaboration between trading partners can occur through the exchange of business messages that contain XML or nonXML documents in a secure, choreographed arrangement called a conversation. Access to the conversation, as well as conversation management, can be provided by a business-to-business (B2B) component. A conversation is, quite simply, a series of business messages exchanged between trading partners, the composition of business messages and the sequence of an exchange being handled by collaborative or public business processes. The composition and sequence of messages can also be handled by Java messaging applications. Conversations can be complex and long-running, or they can be short-lived. Each conversation can have a unique name, and each participant in a conversation can have a conversation role, such as that of a buyer or a supplier in a supply-chain arrangement.

Details of a conversation, including its name and version, the roles of the participants, and the business protocols it uses, can be specified in a conversation definition. Integration specialists can create conversation definitions and monitor running conversations using a console, for example, that is provided by a B2B component.

Business processes can be designed to be started or stopped by users, or to include tasks that must be performed by users.

These tasks can include making discretionary decisions, handling exceptions, or troubleshooting problems. An application integration component can provide an application called a "worklist" that people can use to start and stop processes, as well as to interact with a running process. Using the worklist, users can handle business process tasks assigned to them, such as making a decision about a customer's credit limit, or they can respond to messages from a process.

An e-commerce community can be formed when a trading partner joins other trading partners to pursue a common business objective. An e-commerce community can exist in different forms, and for different purposes. It might, for example, span multiple departments within a company to manage inventory across the company. A community can also span multiple companies across firewalls and over the Internet to manage a supply chain or a multi-step purchasing arrangement, and can include trading partners both within a company and in other companies, such that one or more trading partners interact with trading partners in other companies.

To participate in the conversations of an e-commerce community, integration specialists can use a B2B console to configure trading partners. Specifically, the specialists can assign trading partners the names by which they will be known in the conversation, and can specify the delivery channels to be used for the exchange of business messages.

A B2B component can also provide certain security services, which can be built upon security services provided by the underlying application server. These security services can include features such as an SSL-based secure platform for conversations, certificate verification that can be used to authenticate the identities of trading partners, digital signatures that can be attached to business messages being exchanged by trading partners, support for nonrepudiation of origin and nonrepudiation of receipt, which are often required by law for critical business messages, and data encryption for business protocols that require this support. B2B integration can be used to quickly and easily connect enterprises, to create and execute collaborative trading partner agreements, and to support multiple business protocols (cXML, ebXML, XOCP, RosettaNet, etc.).

An application integration (AI) component can utilize J2EE CA-compliant adapters, such as service and event adapters, to connect to an EDI-capable system. An application view can be used to integrate business processes with the EDI system. The application integration component can provide the functionality needed to design, execute, and monitor complex, enterprise-wide processes that span applications, systems, and people. The AI component can include a Java-based process engine that manages the run-time execution of business processes throughout the enterprise.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method for validating a user on an application server, comprising:

receiving a request for access from an external user with an external user identity at an access point of an application on an application server, wherein an internal user identity is configured to provide access to resources at the application server for users with that internal user identity;

authenticating the external user based at least on user credentials associated with the external user in response to the request for access;

upon successful authentication, switching the identity of the external user to the internal user identity for the application by pushing internal user information on a user stack for the external user, so that the internal user identity governs access to resources at the application server for the external user, wherein switching the identity of the external user to the internal user identity includes adding internal user context information to the external user identity;

upon the external user exiting the application server, popping the internal user information from the user stack, so that the external user is switched back to the external user identity; and providing, by the internal user identity, to the external user, a higher level of privilege in the application server, that is unavailable for the external user as the external user identity.

2. A method according to claim 1, wherein:
authenticating the external user involves checking information for the user against user information in a database in communication with the application server.

3. A method according to claim 1, further comprising:
limiting access for application resources to users with an internal user identity.

4. A method according to claim 1, further comprising:
selecting a single internal user identity to be used to provide access for each application and resource on the application server.

5. A method according to claim 1, further comprising:
allowing a user to access certain resources on the application server without switching the identity of the user.

6. A method according to claim 1, wherein:
the identity of the external user is switched only after the user attempts access requiring an internal user identity.

7. A system embodied on computer readable storage medium comprising:

an application server; and multiple applications on the application server, each of the multiple applications having an access point including a validation mechanism for validating an external user with an external user identity, the validation mechanism of an application on the application server switching the identity of a validated external user to an internal user identity after the external user is validated by pushing internal user information on a user stack for the external user, so that the internal user identity governs access to resources at the application server for the external user, wherein switching the identity of the external user to the internal user identity includes adding internal user context information to the external user identity, and upon the external user exiting the application server, popping the internal user information from the user stack, so that the external user is switched back to the external user identity;

wherein the internal user identity is configured to provide access to resources at the application server for users with that internal user identity including a higher level of privilege in the application server that is unavailable for the external user as the external user identity.

8. The system according to claim 7, wherein:
the multiple applications are integration applications.

9. A system according to claim 7, further comprising:
at least one trading partner having permissions on the application server and the multiple applications running on the application server.

10. The system according to claim 7, further comprising:
a database in communication with the application server for storing information related to any user of an application.

11. The system according to claim 7, wherein:
the multiple applications running on the application server have access mechanisms that is a portal component.

12. The system according to claim 7, further comprising:
application resources that are accessible only to a user with an internal user identity.

13. The system according to claim 7, wherein:
a single internal user identity is used for each of the multiple applications.

14. The system according to claim 7, wherein:
each application of the multiple applications communicates with any other application running on the application server without re-validating the external user.

15. The system according to claim 7, wherein:
at least one of the multiple applications has multiple access mechanisms.

16. The system according to claim 7, wherein:
the multiple applications have access mechanisms selected from the group consisting of databases, queues, and administrative frameworks.

17. The system according to claim 7, further comprising:
application resources accessed by an external user without the identity of the external user being switched.

18. The system according to claim 7, wherein:
the validation mechanism switches the identity of a validated user only after the user attempts access requiring an internal user identity.

19. A method for validating a user on an application server, comprising:
receiving a request for access from an external user with an external user identity at an access point of an application on an application server, wherein an internal user identity is configured to provide access to resources at the application server for users with that internal user identity;

authenticating the external user based at least on user credentials associated with the external user in response to the request for access;

upon successful authentication, switching the identity of the external user to the internal user identity for the application by pushing internal user information on a user stack for the external user, so that the internal user identity governs access to resources at the application server for the external user, wherein switching the identity of the external user to the internal user identity includes adding internal user context information to the external user identity,;

forwarding the request for access to a second application on the application server, wherein the internal user identity allows the external user access to the second application without needing a separate valid username and password for the second application upon the external user exiting the application server, popping the internal user information from the user stack, so that the external user is switched back to the external user identity; and providing, by the internal user identity, to the external user, a higher level of privilege in the application server, that is unavailable for the external user as the external user identity;

wherein configuring access rights for the internal user identity also modifies access to those resources as subsequently provided to each user switched to the internal user identity.

* * * * *

UNITED STATES PATENT AND TRADEMARK OFFICE
CERTIFICATE OF CORRECTION

PATENT NO. : 7,552,222 B2 Page 1 of 1
APPLICATION NO. : 10/212303
DATED : June 23, 2009
INVENTOR(S) : Sandilya Garimella et al.

It is certified that error appears in the above-identified patent and that said Letters Patent is hereby corrected as shown below:

In column 1, line 18, delete "Famework" and insert -- Framework --, therefor.

In column 3, line 5, delete "100,102" and insert -- 100, 102 --, therefor.

In column 3, line 64, delete "Since" and insert -- since --, therefor.

In column 5, line 54, delete "exsisting" and insert -- existing --, therefor.

In column 10, line 20, in claim 19, delete "identity,;" and insert -- identity; --, therefor.

Signed and Sealed this

Twenty-ninth Day of June, 2010

David J. Kappos
*Director of the United States Patent and Trademark Office*